(12) United States Patent
Garry et al.

(10) Patent No.: US 10,753,614 B2
(45) Date of Patent: Aug. 25, 2020

(54) FUEL INJECTOR WITH INTERWEAVED PILOT AND MAINS PASSAGES

(71) Applicant: ROLLS-ROYCE PLC, London, Greater London (GB)

(72) Inventors: Ian M Garry, Leicester (GB); Mark Glover, Derby (GB); Richard Mellor, Solihull (GB); Frederic Witham, Bristol (GB)

(73) Assignee: ROLLS-ROYCE plc, London (GB)

( * ) Notice: Subject to any disclaimer, the term of this patent is extended or adjusted under 35 U.S.C. 154(b) by 188 days.

(21) Appl. No.: 15/923,570

(22) Filed: Mar. 16, 2018

(65) Prior Publication Data

US 2018/0283693 A1    Oct. 4, 2018

(30) Foreign Application Priority Data

Mar. 28, 2017    (GB) .................... 1704899.2

(51) Int. Cl.
| | |
|---|---|
| *F23R 3/28* | (2006.01) |
| *F23R 3/34* | (2006.01) |
| *F02C 7/22* | (2006.01) |
| *F02C 7/228* | (2006.01) |
| *F23R 3/36* | (2006.01) |

(52) U.S. Cl.
CPC .............. *F23R 3/286* (2013.01); *F02C 7/222* (2013.01); *F02C 7/228* (2013.01); *F23R 3/28* (2013.01); *F23R 3/283* (2013.01); *F23R 3/343* (2013.01); *F23R 3/36* (2013.01); *F05D 2230/31* (2013.01)

(58) Field of Classification Search
CPC .. F23R 3/28; F23R 3/286; F23R 3/283; F23R 3/343; F23R 3/36; F02C 7/222; F02C 7/224; F02C 7/228
See application file for complete search history.

(56) References Cited

U.S. PATENT DOCUMENTS

| | | | |
|---|---|---|---|
| 3,159,971 A | * | 12/1964 | Moebius .............. F23R 3/283 60/740 |
| 4,735,044 A | | 4/1988 | Richey et al. |
| 7,841,368 B2 | | 11/2010 | McMasters et al. |

(Continued)

FOREIGN PATENT DOCUMENTS

| | | |
|---|---|---|
| CN | 104713128 A | 6/2015 |
| EP | 3171087 A1 | 5/2017 |

(Continued)

*Primary Examiner* — Steven M Sutherland
(74) *Attorney, Agent, or Firm* — Oliff PLC

(57) ABSTRACT

A fuel injector provided for gas turbine engine has a nozzle including pilot fuel and mains fuel discharge orifice's for respectively spraying pilot and mains fuel flows into a combustor of the engine. The injector further has a feed arm extending to the nozzle for feeding fuel to the pilot and mains discharge orifices from pilot and mains supplies respectively. The nozzle and the feed arm contain one or more pilot passages for flow of the pilot fuel flow from the pilot supply to the pilot discharge orifice and one or more mains passages for flow of the mains fuel flow from the mains supply to the mains discharge orifice. The nozzle and the feed arm contain a plurality of the pilot passages and/or a plurality of the mains passages. The pilot and the mains passages intertwine repeatedly, and are both smoothly curved as they intertwine around each other.

8 Claims, 3 Drawing Sheets

(56) References Cited

U.S. PATENT DOCUMENTS

| | | |
|---|---|---|
| 8,336,313 B2 | 12/2012 | McMasters et al. |
| 10,378,446 B2 * | 8/2019 | Caples .................... F23R 3/283 |
| 2015/0135716 A1 * | 5/2015 | Ginessin ................... F23R 3/28 60/737 |
| 2017/0248318 A1 * | 8/2017 | Kulkarni ................. F02C 7/222 |

FOREIGN PATENT DOCUMENTS

| | | |
|---|---|---|
| GB | 2488694 A | 9/2012 |
| WO | 2014/081334 A1 | 5/2014 |

* cited by examiner

Fig. 3A
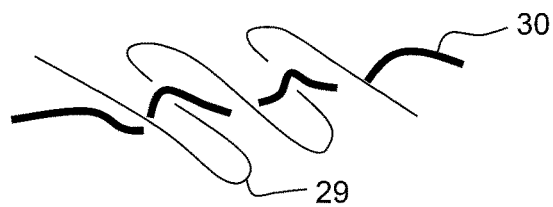
Fig. 3B
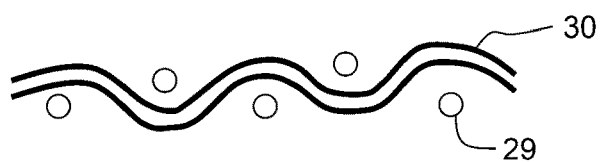
Fig. 3C
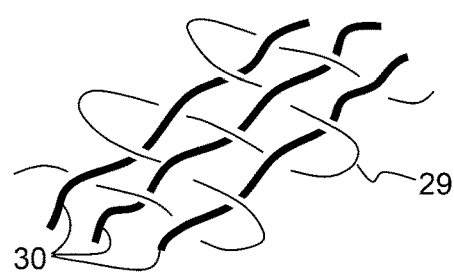
Fig. 3D
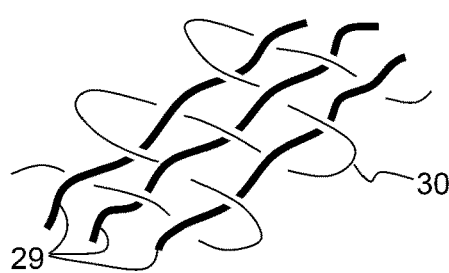
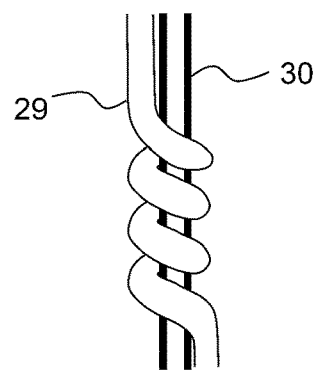
Fig. 4

FUEL INJECTOR WITH INTERWEAVED PILOT AND MAINS PASSAGES

FIELD OF THE INVENTION

The present invention relates to a fuel injector for a gas turbine engine.

BACKGROUND

Fuel injection systems deliver fuel to the combustion chamber of a gas turbine engine, where the fuel is mixed with air before combustion. One form of fuel injection system well-known in the art utilises fuel spray nozzles. These atomise the fuel to ensure its rapid evaporation and burning when mixed with air. Typical fuel injectors have a fuel spray nozzle containing one or more fuel discharge orifices, and a feed arm which extends from the nozzle to one or more fuel supplies (e.g. engine fuel manifolds). Passages in the feed arm and the nozzle transport the fuel from the supplies to the discharge orifices. An annular combustor usually has a circumferential arrangement of such fuel injectors.

One type of fuel injector has an airspray nozzle in which fuel delivered to the combustion chamber by one or more fuel discharge orifices in the nozzle is aerated by air circuits carrying air discharged from a compressor of the engine. Swirlers in the air circuits can ensure rapid mixing of fuel and air at the discharge orifices, to create a finely atomised fuel spray. More specifically, the swirlers impart a swirling motion to the air passing therethrough, so as to create a high level of shear and hence acceleration of low velocity fuel films.

Another type of fuel injector is a pressure-jet injector in which the fuel is passed through a swirl chamber and thence to a discharge orifice, where the fuel is atomised to form a cone-shape spray. The rate of swirl and the pressure of the fuel determine the extent of atomisation.

Multi-stage combustors are used particularly in lean burn fuel systems of gas turbine engines to reduce unwanted emissions while maintaining thermal efficiency and flame stability. Thus duplex systems have pilot and mains fuel manifolds feeding pilot and mains fuel discharge orifices respectively of each fuel spray nozzle. In such combustors the input of fuel is "staged": a pilot flow of fuel through the pilot discharge orifice being used for low power operation and a mains flow of fuel through the mains discharge orifice being brought in additionally for higher power operation. The fuel for the manifolds typically derives from a pumped and metered supply. A splitter valve can then be provided to selectively split the metered supply between the manifolds as required for a given staging.

Within fuel injectors of such a duplex system, check/distribution valves, known as a fuel flow scheduling valves (FSVs), are typically associated with the feed arms so that when a mains stage is de-staged, the valves provide a drip tight seal preventing mains fuel from leaking into the injector. A problem can arise, however, in that the mains fuel left in the mains passages of the injectors when the mains passage is not flowing is stagnant. In this state, heat soaking into the injector (e.g. from the surrounding high temperature air discharged by the engine compressor, and/or radiated from the combustor) can cause the fuel to heat up and react, leading to coking in the passages. Thus controlling the temperature of the fuel inside the passages is important. On the other hand, the higher the temperature at which fuel is burnt in the combustor, the higher the efficiency of the combustion process and the greater the engine performance.

It would be desirable to provide a fuel injector that improves management of these conflicting requirements.

SUMMARY

Accordingly, in a first aspect, the present invention provides a fuel injector for a gas turbine engine, the injector having a nozzle including a pilot fuel discharge orifice (which typically is always flowing fuel during engine operation) and a mains fuel discharge orifice (which typically only flows at certain ranges of power settings) for respectively spraying pilot and mains fuel flows into a combustor of the engine, and further having a feed arm extending to the nozzle for feeding fuel to the pilot and mains discharge orifices from pilot and mains supplies respectively;

wherein the nozzle and the feed arm contain one or more pilot passages for flow of the pilot fuel flow from the pilot supply to the pilot discharge orifice and one or more mains passages for flow of the mains fuel flow from the mains supply to the mains discharge orifice; and wherein the pilot and the mains passages intertwine repeatedly and/or one of the pilot and the mains passages spirals repeatedly around the other of the pilot and the mains passages.

Advantageously, by intertwining and/or spiralling the passages the amount of surface area for heat transfer between the pilot and mains passages can be significantly increased, thereby promoting heat transfer between the fuel contained in the passages. Thus, for example, stagnant fuel in the mains passages when mains is de-staged can be better cooled by the fuel flowing in the pilot passages, thereby improving the control of heat soak into the mains fuel. In this way thermal management of the injector can be improved, which in turn enables the combustor to run hotter and the engine performance to be improved, whilst preventing the fuel from degrading.

By passages "intertwining" we preferably mean that the passages interweave with one another such that each passage passes alternately and repeatedly over and under other passage(s). More preferably, each passage curves sinusoidally as it passes alternately and repeatedly over and under other passage(s).

In a second aspect, the present invention provides a combustor for a gas turbine engine having a plurality of fuel injectors according to the first aspect.

In a third aspect, the present invention provides a gas turbine engine having a combustor according to the second aspect.

In a fourth aspect, the present invention provides a method of forming a fuel injector according to the first aspect, the method including forming the pilot and the mains passages by additive layer manufacture.

Advantageously, additive layer manufacture allows complex interwoven and/or spiralling passage structures to be formed that could not be economically fabricated by more conventional forming techniques such as turning and milling of separate pieces which are then brazed or welded together.

Optional features of the invention will now be set out. These are applicable singly or in any combination with any aspect of the invention.

The pilot and the mains passages may intertwine in the nozzle and/or the feed arm.

One of the pilot and the mains passages may spiral repeatedly around the other of the pilot and the mains passages in the feed arm.

Preferably, in the case of spiralling passages, the pilot passages spiral repeatedly around the mains passages. As well as promoting heat transfer, the pilot passages can then also shield the mains passages from heat soaking into the injector.

Preferably, the passages are smoothly curved as they intertwine and/or spiral around each other, i.e. abrupt changes of direction are avoided. This can reduce the pressure drop across the fuel passages and can reduce the likelihood of local fuel recirculation within the fuel passages.

The pilot fuel discharge orifice and the mains fuel discharge orifice may be coaxial. For example, the pilot fuel discharge orifice may be radially inwards of the mains fuel discharge orifice.

The nozzle may be an airspray nozzle, the nozzle having one or more air circuits for directing discharge air from a compressor of the engine to the pilot and the mains discharge orifices, thereby atomising the fuel flows sprayed by the discharge orifices.

The pilot and the mains passages may be formed by additive layer manufacture.

BRIEF DESCRIPTION OF THE DRAWINGS

Embodiments of the invention will now be described by way of example with reference to the accompanying drawings in which:

FIG. 3 shows schematically (a) a first arrangement of an intertwined pilot fuel passage and a mains fuel passage, (b) a cross-section along the mains fuel passage of the first arrangement, (c) a second arrangement of an intertwined pilot fuel passage and plural mains fuel passages, and (d) a third arrangement of an intertwined mains fuel passage and plural pilot fuel passages; and FIG. 4 shows schematically a fourth arrangement of a spiralling pilot fuel passage and a mains fuel passage.

DETAILED DESCRIPTION AND FURTHER OPTIONAL FEATURES

Figure 1:
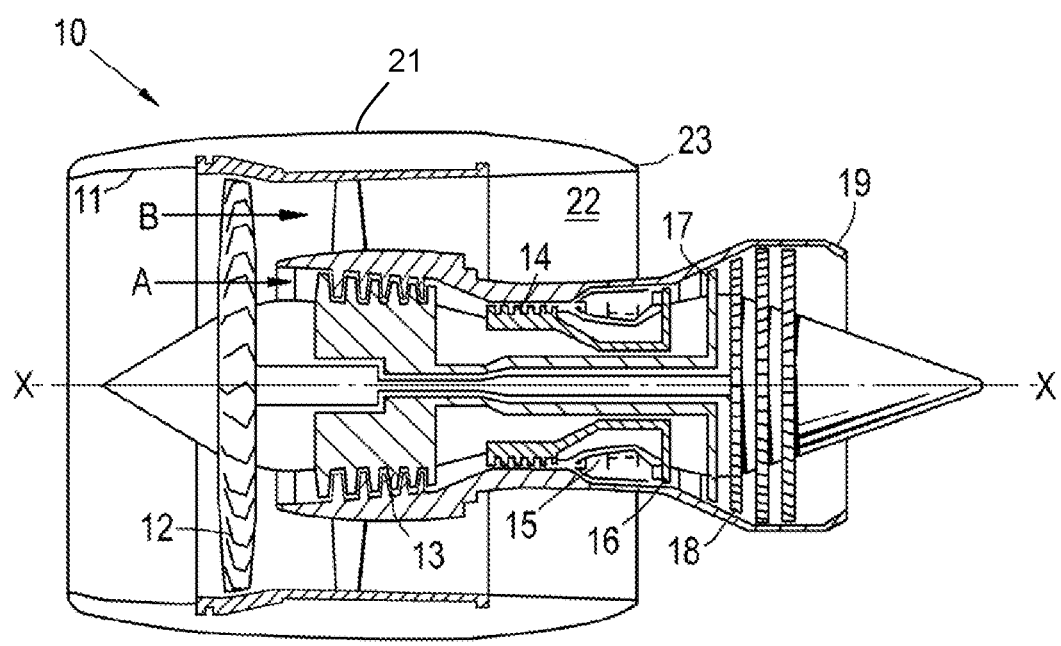
FIG. 1 shows a longitudinal cross-section through a ducted fan gas turbine engine.

With reference to FIG. 1, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

Figure 2A:
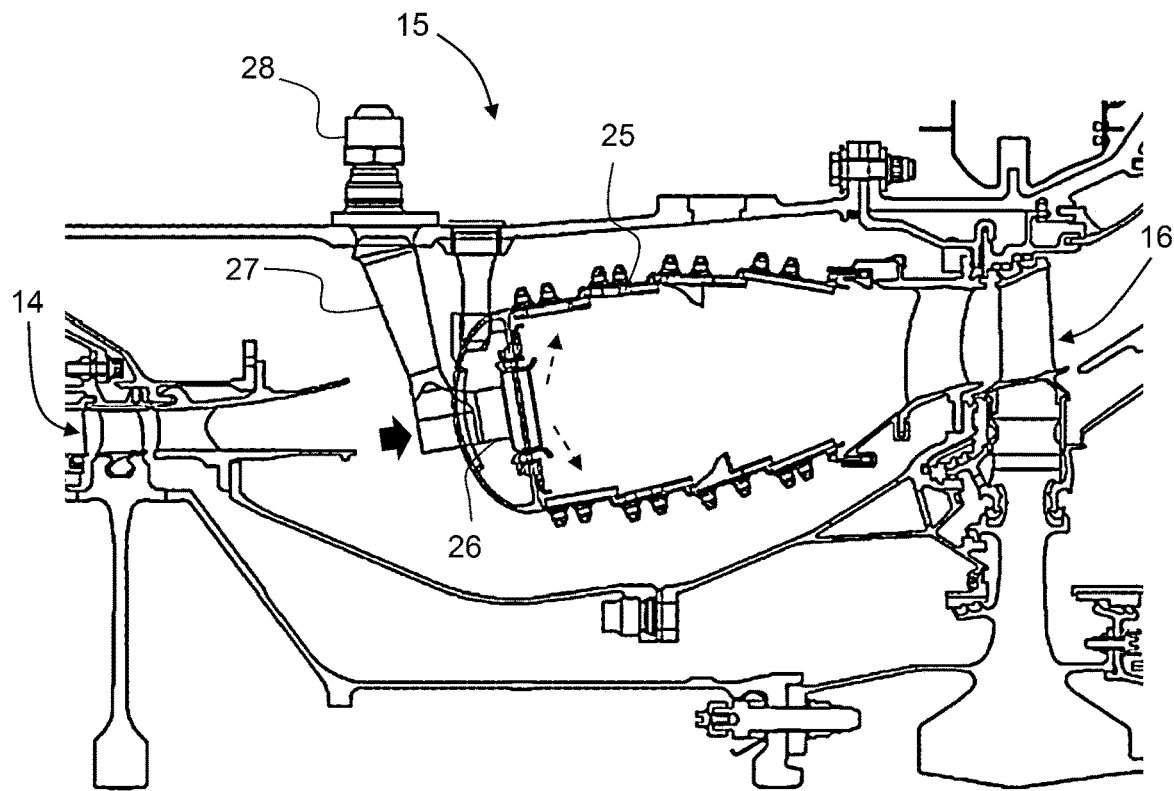
FIG. 2A shows a longitudinal cross-section through combustion equipment of the gas turbine engine of FIG. 1.
Figure 2B:
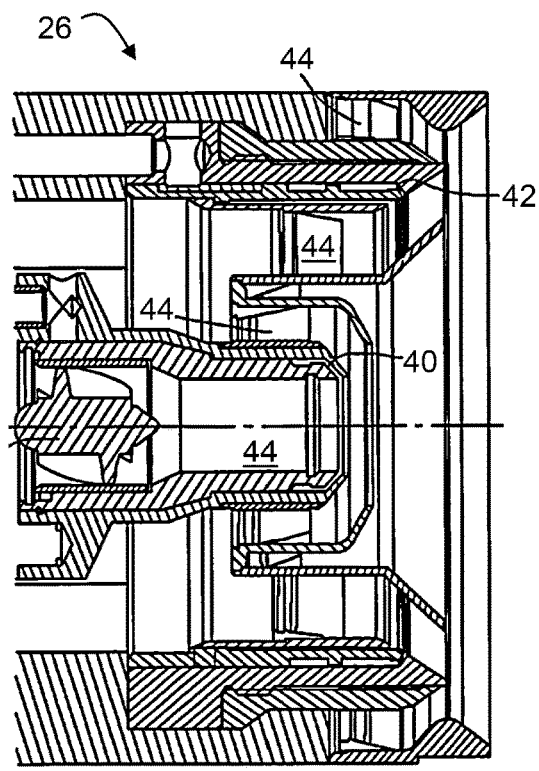
FIG. 2B shows a longitudinal cross-section through a nozzle of an injector of the combustion equipment of FIG. 2A.

FIG. 2A shows a longitudinal cross-section through the combustion equipment 15 of the gas turbine engine 10 of FIG. 1. A row of (e.g. lean burn) dual-fuel circuit fuel injectors spray the fuel (dashed line arrows) into an annular combustor 25, each injector having an airspray nozzle 26 (shown in more detail in FIG. 2B) containing a coaxial arrangement of an inner pilot fuel discharge orifice 40 and an outer mains fuel discharge orifice 42, with a feed arm 27 of the injector extending from an injector head 28 to the nozzle. The injector head connects the injector to pilot and mains fuel manifolds (not shown) to supply pilot and mains fuel to respectively the pilot and mains discharge orifices via one or more pilot fuel passages and one or more mains fuel passages which extend internally through the feed arm and the nozzle. The nozzle also contains air swirler circuits 44 which receive air discharged from the high-pressure compressor 14 (block arrow). The circuits impart swirl to the air, and direct the swirling air to the pilot and the mains discharge orifices to finely atomise the fuel sprays.

When fuel reaches temperatures above a critical level, it starts to produce a carbon deposit on any surface that it comes into contact with such as internal surfaces of the pilot and mains passages of the injector. This phenomenon is known as "coking" and it has a detrimental effect on the performance of the injector and the efficiency of the combustion process. The problem of coking is particularly acute in respect of the mains fuel passages of the injector because, when mains is de-staged, the fuel in these passages becomes stagnant. However, by improving the control of the heat transfer within the injector, the fuel temperature within the injector can be maintained at a level that results in reduction or elimination of coking. Also, with this improved heat transfer, the fuel system can absorb more heat from the engine's oil system, which leads to improved oil system cooling efficiency.

FIG. 3 shows schematically (a) a first arrangement of a pilot fuel passage 29 and a mains 30 fuel passage, (b) a cross-section along the mains fuel passage of the first arrangement, (c) a second arrangement of a pilot fuel passage 29 and plural mains 30 fuel passages, and (d) a third arrangement of plural pilot fuel passages 29 and a mains 30 fuel passage. The first, second and third arrangements can be located, for example, in the airspray nozzle 26 of the injector of FIG. 2, but additionally or alternatively similar arrangements can be located in the feed arm 27.

In all three arrangements, the pilot and the mains passages are repeatedly intertwined or "woven" around each other. This increases the surface area for heat exchange between the passages. By increasing the surface area for heat exchange, the efficiency of the heat exchange process between the passages increases, thus enhancing the thermal capability of the injector. In particular, the improved thermal efficiency/capability results in a lower temperature rise in the mains fuel when it becomes stagnant in the injector, as it better cooled by the uninterrupted pilot fuel flow. With a lower temperature rise of the stagnant mains fuel, the environment of the nozzle 26 can be changed (e.g. so that its temperature is increased) as this will no longer lead to unacceptable levels of coking. This higher temperature in the surrounding environment results in improved combustor efficiency and improved engine performance. Additionally or alternatively, the fuel inlet temperature to the injector can be increased, which improves the efficiencies of the engine's oil cooling system and the engine's thermodynamic cycle. Additionally or alternatively, less heat-shielding could be used in the fuel injector, reducing the cost and mass of the injector. Additionally or alternatively, surface finish constraints on the fuel-wetted passages can be relaxed, providing more options for manufacturing the injector and so reduced component cost.

Conveniently, the intertwined or woven pilot and the mains passages can be fabricated by additive layer manufacture (ALM). This fabrication approach allows the complex intertwined structure of the passages to be produced accurately and cost-effectively. In particular, ALM facilitates the production of smoothly curved transitions as the passages intertwine. These smooth transitions help keep the fuel flow through the passages constant. If the transitions were sharp or abrupt, they would encourage stagnation points to form within the passages, which would increase fuel coking.

FIG. 4 shows schematically a fourth arrangement of a pilot fuel passage 29 and a mains 30 fuel passage. In this arrangement, the pilot passage spirals around the mains passage, for example as the passages extend along the feed arm 27. The spiralling pilot passage not only has an increased surface area for heat exchange with the mains passage, but also shields the mains passage to an extent from heat soaking in to the injector.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

What is claimed is:

1. A fuel injector for a gas turbine engine, the fuel injector having a nozzle including a pilot fuel discharge orifice and a mains fuel discharge orifice for respectively spraying pilot and mains fuel flows into a combustor of the gas turbine engine, and further having a feed arm extending to the nozzle for feeding fuel to the pilot and mains fuel discharge orifices from pilot and mains supplies respectively;
   wherein the nozzle and the feed arm contain either: (i) plural pilot passages for flow of the pilot fuel flow from the pilot supply to the pilot fuel discharge orifice and one or more mains passages for flow of the mains fuel flow from the mains supply to the mains fuel discharge orifice, or (ii) one or more pilot passages for flow of the pilot fuel flow from the pilot supply to the pilot fuel discharge orifice and plural mains passages for flow of the mains fuel flow from the mains supply to the mains fuel discharge orifice; and
   wherein the pilot and the mains passages interweave with one another such that each passage passes alternately and repeatedly over and under other of the passages, the pilot and the mains passages being smoothly curved as they interweave with each other.

2. The fuel injector according to claim 1, wherein the pilot and the mains passages interweave in the nozzle and/or the feed arm.

3. The fuel injector according to claim 1, wherein the pilot fuel discharge orifice and the mains fuel discharge orifice are coaxial.

4. The fuel injector according to claim 3, wherein the pilot fuel discharge orifice is radially inwards of the mains fuel discharge orifice.

5. The fuel injector according to claim 1, wherein the nozzle is an airspray nozzle, the nozzle having one or more air circuits for directing discharge air from a compressor of the gas turbine engine to the pilot and the mains fuel discharge orifices, thereby atomising the fuel flows sprayed by the pilot and mains fuel discharge orifices.

6. The fuel injector according to claim 1, wherein the pilot and the mains passages are formed by additive layer manufacture.

7. A combustor for a gas turbine engine having a plurality of the fuel injectors according to claim 1.

8. A gas turbine engine having the combustor according to claim 7.

* * * * *